United States Patent
Lu et al.

(10) Patent No.: US 10,625,214 B2
(45) Date of Patent: Apr. 21, 2020

(54) TITANIUM DIOXIDE / SULFONATED GRAPHENE OXIDE / AG NANOPARTICLE COMPOSITE MEMBRANE AND PREPARATION AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 68 days.

(21) Appl. No.: 16/172,739

(22) Filed: Oct. 27, 2018

(65) Prior Publication Data

US 2019/0126211 A1 May 2, 2019

(30) Foreign Application Priority Data

Oct. 27, 2017 (CN) .......................... 2017 1 1030595

(51) Int. Cl.
*B01D 71/02* (2006.01)
*B01D 67/00* (2006.01)
(Continued)

(52) U.S. Cl.
CPC ........... *B01D 71/024* (2013.01); *B01D 17/00* (2013.01); *B01D 67/0041* (2013.01);
(Continued)

(58) Field of Classification Search
CPC .. B01D 71/024; B01D 67/0041; B01D 17/00; B01D 71/021; B01D 67/0072; B01D 67/0076; B01D 69/12; B01D 71/022; C01B 32/198; B82Y 30/00; B82Y 40/00; C01P 2004/16; C01P 2004/03; C02F 1/44; C02F 1/32; C02F 2101/308; C02F 2101/325;
(Continued)

(56) References Cited

FOREIGN PATENT DOCUMENTS

CN 104815616 A * 8/2015

* cited by examiner

*Primary Examiner* — Taiwo Oladapo
(74) *Attorney, Agent, or Firm* — SZDA Law PC

(57) ABSTRACT

Titanium dioxide/sulfonated graphene oxide/silver nanoparticle composite membrane and its preparation method and application are disclosed. Mixing graphene oxide, sodium chloroethanesulfonate, and sodium hydroxide uniformly in the water, and then adding concentrated nitric acid to obtain sulfonated graphene oxide; mixing the aqueous solution of said sulfonated graphene oxide with the aqueous solution of silver nitrate, stirring in the dark, then adding ascorbic acid, and continuing to stir to obtain a silver nanoparticle/sulfonated graphene oxide composite material; dispersing said silver nanoparticle/sulfonated graphene oxide composite material in water, and then deposited on said titanium dioxide nanorods arrays by vacuum deposition, and vacuum dried to obtain titanium dioxide/sulfonated graphene oxide/silver nanoparticle composite membrane. The membrane possessed photocatalytic effect under UV light and special wettability: super-hydrophobic oil under water/super-hydrophobic under oil, which could in situ separation and degradation of oil/water emulsion.

4 Claims, 4 Drawing Sheets

(51) Int. Cl.
| | |
|---|---|
| *C01G 23/08* | (2006.01) |
| *C01B 32/198* | (2017.01) |
| *B22F 9/18* | (2006.01) |
| *B22F 1/00* | (2006.01) |
| *B01D 69/12* | (2006.01) |
| *C02F 1/00* | (2006.01) |
| *B01D 17/00* | (2006.01) |
| *B82Y 30/00* | (2011.01) |
| *B82Y 40/00* | (2011.01) |

(52) U.S. Cl.
CPC ..... *B01D 67/0072* (2013.01); *B01D 67/0076* (2013.01); *B01D 69/12* (2013.01); *B01D 71/021* (2013.01); *B01D 71/022* (2013.01); *B22F 1/0018* (2013.01); *B22F 9/18* (2013.01); *C01B 32/198* (2017.08); *C01G 23/08* (2013.01); *C02F 1/00* (2013.01); *B22F 2301/255* (2013.01); *B82Y 30/00* (2013.01); *B82Y 40/00* (2013.01); *C01P 2004/03* (2013.01); *C01P 2004/16* (2013.01)

(58) Field of Classification Search
CPC .. C02F 2305/10; C02F 1/725; C02F 2305/08; C02F 1/00; B22F 2007/042; B22F 9/24; B22F 9/18; B22F 1/0018; B22F 2301/255; C22C 5/06; C01G 23/053; C01G 23/0536; C01G 23/08; B01J 27/02; B01J 35/004; C23C 18/1216; C23C 26/00
See application file for complete search history.

TITANIUM DIOXIDE / SULFONATED GRAPHENE OXIDE / AG NANOPARTICLE COMPOSITE MEMBRANE AND PREPARATION AND APPLICATION THEREOF

RELATED APPLICATION

This application claims priority from Chinese Patent Application No. 201711030595, filed, Oct. 27, 2017, which is incorporated by reference in its entirety.

FIELD OF THE INVENTION

The present invention belongs to the functional material technology, relates to the preparation and application of a special wettability of super hydrophobic oil underwater/super hydrophobic under oil compound membrane material, especially relates to a titanium dioxide/sulfonated graphene oxide/Ag nanoparticle composite membrane and preparation method and application thereof.

TECHNICAL BACKGROUND

Global water pollution has made the rising awareness of sewage treatment and renewable energy industry, and various materials have been developed to remove the pollutants in the water. However, materials that are used in emulsion separation and one-step organic dye degradation are rare.

SUMMARY OF THE INVENTION

The object of the present invention is to prepare silver nanoparticles through reduction reaction on the surface of sulfonated graphene oxide by a copper mesh with titanium dioxide nanorod array prepared by solvothermal and hydrothermal methods, and to prepare a super hydrophobic oil underwater/super hydrophobic under oil compound membrane material with photocatalytic effect under UV light and special wettability by vacuum deposition, so as to separate and degrade the oil-water emulsion in situ to achieve wide application in the treatment of sewage oil and oil-water emulsion separation.

In order to achieve the above object, the specific technical scheme of the present invention is as follows:

A preparation method of titanium dioxide/sulfonated graphene oxide/silver nanoparticle composite membrane, comprising the following steps:

(1) mixing graphene oxide, sodium chloroethanesulfonate, and sodium hydroxide uniformly in the water, and then adding concentrated nitric acid to obtain sulfonated graphene oxide;

(2) mixing the aqueous solution of said sulfonated graphene oxide with the aqueous solution of silver nitrate, stirring in the dark, then adding ascorbic acid, and continuing to stir to obtain a silver nanoparticle/sulfonated graphene oxide composite material;

(3) preparing titanium dioxide nanoclusters on a metal mesh by using tetra-n-butyl titanate, glycerol, and ethanol as raw materials to obtain a metal mesh with titanium dioxide nanoclusters; then the metal mesh with titanium dioxide nanoclusters is put in a mixed solution of titanium trichloride, saturated aqueous solution of sodium chloride and urea, said metal mesh is removed after the reaction to obtain titanium dioxide nanorod arrays;

(4) dispersing said silver nanoparticle/sulfonated graphene oxide composite material in water, and then deposited on said titanium dioxide nanorods arrays by vacuum deposition, and vacuum dried to obtain titanium dioxide/sulfonated graphene oxide/silver nanoparticle composite membrane.

The present invention also disclosed a silver nanoparticle/sulfonated graphene oxide composite material and its preparation method, comprising the following steps:

(1) mixing graphene oxide, sodium chloroethanesulfonate, and sodium hydroxide uniformly in the water, and then adding concentrated nitric acid to obtain sulfonated graphene oxide;

(2) mixing the aqueous solution of said sulfonated graphene oxide with the aqueous solution of silver nitrate, stirring in the dark, then adding ascorbic acid, and continuing to stir to obtain a silver nanoparticle/sulfonated graphene oxide composite material.

The present invention also disclosed a kind of titanium dioxide nanorod arrays and the preparation method, comprising the following steps:

preparing titanium dioxide nanoclusters on a metal mesh by using tetra-n-butyl titanate, glycerol, and ethanol as raw materials to obtain a metal mesh with titanium dioxide nanoclusters; then the metal mesh with titanium dioxide nanoclusters is put in a mixed solution of titanium trichloride, saturated aqueous solution of sodium chloride and urea, said metal mesh is removed after the reaction to obtain titanium dioxide nanorod arrays.

In the present invention, the metal mesh is a copper mesh, preferably a cleaned copper mesh, the metal mesh is removed by acid, for example, dissolved in sulfuric acid.

In the present invention, the mass ratio of graphene oxide, sodium chloroethanesulfonate, and sodium hydroxide is 0.2:3:1.6; after mixing said graphene oxide, sodium chloroethanesulfonate, and sodium hydroxide uniformly in water, ultrasonic stirring for 3 hours at room temperature, and then adding concentrated nitric acid; after the reaction is completed, the product is centrifuged, washed and dried to obtain sulfonated graphene oxide. Using this raw material ratio can provide sulfonated graphene oxide needed and consume less raw materials, which controlling the hydrous thickness of sulfonated graphene oxide layer, that is beneficial of degradation.

In the present invention, the mass ratio of sulfonated graphene oxide, silver nitrate and ascorbic acid is 1:6.8:8.8; said stirring is carried out in the dark for 3 hours at 25° C.; the time of continued stirring is 1 hour. Using this raw material ratio can obtain uniform dispersion of silver nanoparticles, achieving a better photocatalytic effect.

In the present invention, the volume ratio of tetra-n-butyl titanate, glycerin, and ethanol is 1:5:15; the temperature of the preparation of titanium dioxide nanoclusters on the metal mesh is 180° C., the time is 24 hours; the mass ratio of urea, titanium trichloride, sodium chloride is 1:2:36.6; the temperature of the reaction is 160° C., and the time is 2 hours. Using this raw material ratio can make an ideal thickness of the titanium dioxide nanoclusters, reducing the pore size and increasing the photocatalytic effect, and the nanoclusters are beneficial of the secondary growth of titanium dioxide nanometer needle, at the same time.

In the present invention, the mass ratio of the silver nanoparticle/sulfonated graphene oxide composite material to the titania nanorod array is 1:50, and the condition of vacuum deposition is −0.1 MPa. The TSA membrane prepared by this composite ratio can effectively control the flow rate and give enough time for photocatalysis, and at the same time achieve the ideal separation effect.

The preparation method of the present invention can be exemplified as follows:

1. Preparation of Sulfonated Graphene Oxide

Mixing graphene oxide (200 mg), sodium chloroethionate (3 g), sodium hydroxide (1.6 g) in 500 mL deionized water and ultrasonic stirring for 3 hours at room temperature. Then 2 mL concentrated nitric acid is added while stirring. The product is centrifuged and washed three times and then dried under dynamic vacuum at 60° C. to obtain sulfonated graphene oxide.

2. Preparation of Silver Nanoparticles and Sulfonated Graphene Oxide Composites

Sulfonated graphene oxide (20 mg) is added to 20 mL of deionized water and dispersed ultrasonically. Silver nitrate (136 mg) is dissolved in 4 mL deionized water. The above prepared liquid is mixed in a 50 mL round bottom flask, stirred for 3 hours at 25° C. in the dark. Then 2 mL (176 mg) ascorbic acid is added quickly and stirring for 1 hour. The product is centrifuged and washed several times to obtain silver nanoparticles/sulfonated graphene oxide composites. The resultant is stored in deionized water.

3. Preparation of Titanium Dioxide Nanorod Arrays

Putting a washed copper net in a reaction vessel, and adding 2.5 mL tetra-n-butyl titanate, 12.5 mL glycerol and 37.5 mL ethanol. The mixture is reacted at 180° C. for 24 hours. The product is washed and then dried under dynamic vacuum. 4.05 mL titanium trichloride, 37.5 mL saturated sodium chloride solution and 0.3 mg urea are uniformly mixed and added in a reaction vessel. Then the above prepared copper mesh with titanium dioxide nanoclusters is added and reacted at 160° C. for 2 hours. When the temperature is cooled to room temperature, the copper mesh is removed, and the product is washed and dried to obtain titanium dioxide nanorod array.

4. Preparation of Composite Membrane 10 mg sulfonated graphene oxide and silver nanoparticle composite material are uniformly dispersed in 200 mL of deionized water and uniformly deposited on the titanium dioxide nanorod array by vacuum deposition. The product is dried in vacuum to obtain the final composite product.

The present invention also disclosed the application of the titanium dioxide/sulfonated graphene oxide/silver nanoparticle composite membrane in the preparation of rapid oil-water separation material, sewage treatment, emulsion separation and degradation of organic dyes.

ADVANTAGES OF THE INVENTION

1. The raw materials are low cost, easy to get; synthetic route is simple, the entire process does not use expensive equipment. Using very simple method to prepare products possessed high separation efficiency, high cycle efficiency.

2. The TSA composite membrane material prepared by the method of the invention can effectively separate the oil-water emulsion and degrade methylene blue dye in one step. At the same time, graphene and titanium dioxide possess high stability, good reusability and so on. This may be a good application in energy and environmental protection.

3. The titanium dioxide/sulfonated graphene oxide/silver nanoparticle (TSA) film disclosed in the present invention possess special wettability and good photocatalytic performance. And it is composed of a layer of titanium dioxide nano-particles having photocatalytic effect and special wettability and a layer of sulfonated graphene oxide and silver nanoparticle films. It exhibits superior oil/water separation performance, high degradation efficiency of soluble methylene blue under ultraviolet light and outstanding stability and durability. The contact angle of oil droplets in water is more than 150°. It can also have good and stable separation efficiency after repeated use of 10 times. The membrane can play an effective application in sewage and wastewater treatment.

4. The prepared composite material possessed the function of emulsion separation and photocatalytic degradation by one-step. The invention has the advantages of high efficiency of emulsion separation, good degradation effect on dyes, good reusability and good repeatability. Most importantly, the product can be industrial production to achieve the purpose of water pollution control.

DETAILED DESCRIPTION OF THE INVENTION

Implementation 1: Synthesis of sulfonated graphene oxide, specific steps are as follows.

180 mL concentrated sulfuric acid and 20 mL concentrated phosphoric acid (180:20) are mixed well. Weighing 1.5 g of graphite flake accurately, and mixing for 15 minutes. Weighing 9 g potassium permanganate, which is added slowly with stirring. Then the mixture is stirred in oil bath at 50° C. for 12 hours. The products are poured in 200 mL water after cooling to room temperature. Then, adding suitable amount of hydrogen peroxide solution until the solution became yellow, the solution is washed with 5% hydrochloric acid for three times after centrifuging. Then, washing with deionized water for many times until PH is 5 to 6. The products are dialyzed for one week, and are changed the water every day. Lastly, the products are put in watch glass under −40° C., and vacuum drying until fluffy.

200 mg of GO, 3 g of sodium 2-chloroethanesulfonate hydrate ($ClCH_2CH_2SO_3Na$) and 1.6 g of NaOH are carefully added into a beaker which is containing 500 mL of deionized (DI) water. The mixture is put into ultrasonic instrument for 3 h in room temperature and then 2 mL of $HNO_3$ is added into the solution. After mixing well, the mixture is centrifuged and washed with ethanol for three times. Finally, the reaction products are dried in vacuum overnight.

Implementation 2: Synthesis of SGO/Ag nanocomposites, specific steps are as follows.

20 mg of SGO is added into 20 mL DI water, and then dispersed uniformly under ultrasonic situation. 136 mg $AgNO_3$ is dissolved into 4 mL DI water. The above prepared solution is put into 50 mL round bottom flask and stirred magnetically for 3 h at 25° C. in the dark. Then, 2 mL ascorbic acid (176 mg) is added into reaction solution quickly and the mixture is kept stirring magnetically for 1 h.

Figure 1:
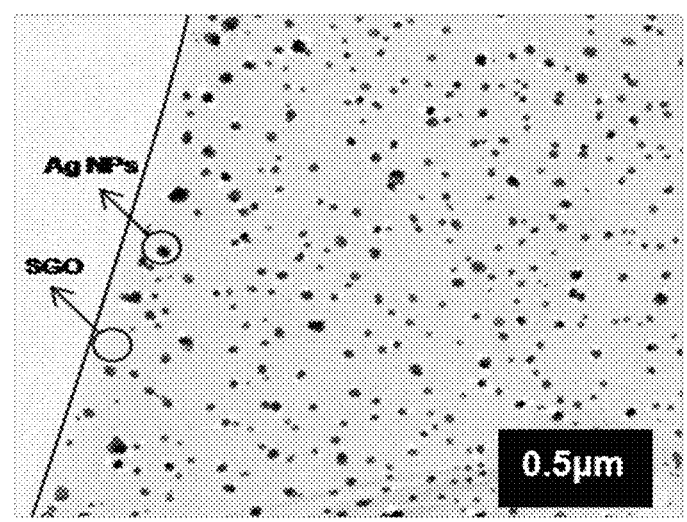
FIG. 1 shows scanning electron microscopy (SEM) picture of silver nanoparticles and sulfonated graphene oxide composites.

The final products are separated by centrifugation and washed with DI water for several times until there is no impurity. The obtained product is stored in the DI water; FIG. 1 is scanning electron microscopy (SEM) picture of silver nanoparticles and sulfonated graphene oxide composites, indicating the distribution of the nanoparticles.

Implementation 3: Preparation of $TiO_2$ nanorod arrays mesh, specific steps are as follows.

Figure 2:
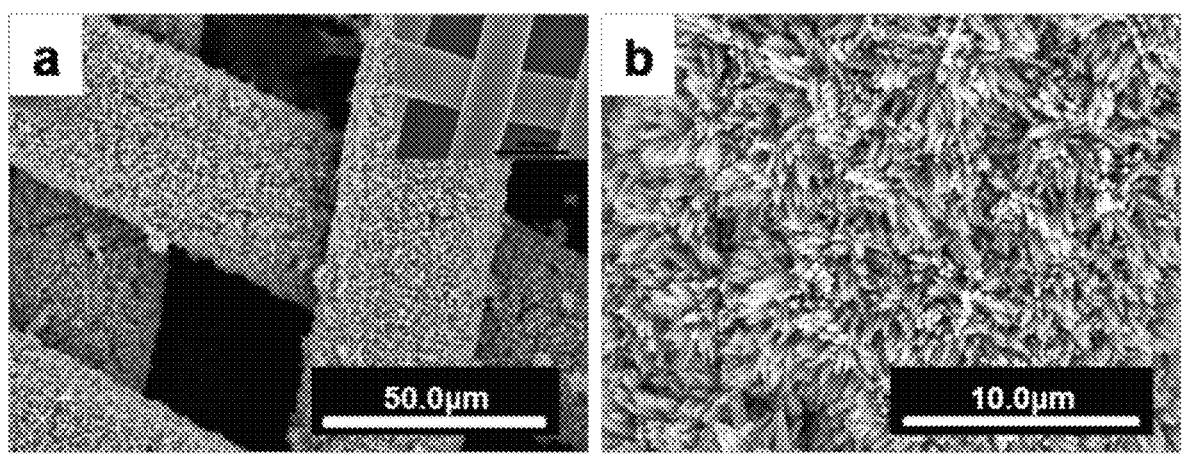
FIG. 2 shows scanning electron microscopy (SEM) picture of titanium dioxide nanorods arrays.

2.5 mL tetra-n-butyl titanate (TBOT), 12.5 mL glycerol and 37.5 mL ethanol is mixed in the beaker and poured into a Teflon-lined autoclave. The cleaned copper mesh is placed in the solution standing against the wall of the autoclave. The autoclave is heated to 180° C. for 24 h, then cooling down to room temperature. Subsequently, the product is taken out, cleaned with DI water and dried in vacuum; 4.05 mL of $TiCl_3$ solution, 37.5 mL supersaturated NaCl solution, 0.3 g of urea are mixed uniformly and poured into the autoclave which has been placed the $TiO_2$ nanocluster-based Mesh. The autoclave is heated to 160° C. for 2 h in oven, then cooling down to room temperature. The mesh is cleaned in dilute sulfuric acid for 5 min, rinsed with DI water and ethanol successively. Finally, the mesh is dried in vacuum. FIG. 2 is scanning electron microscopy (SEM) of the titanium dioxide nanorod arrays, indicating the distribution of the nanorods.

Implementation 4: Fabrication of TSA membrane, specific steps are as follows.

Figure 3:
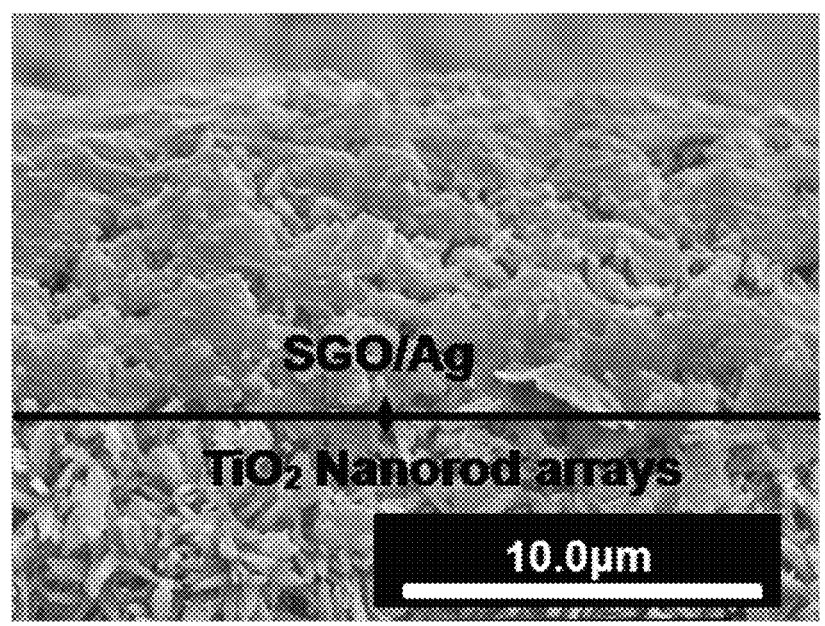
FIG. 3 shows the cross sectional SEM figure of the TSA membrane.

10 mg of SGO/Ag nanocomposites is dispersed uniformly in 200 mL DI water and filtered onto the surface of $TiO_2$ nanorod arrays mesh in vacuum. Then the product is washed by DI water for several times until SGO/Ag nanocomposites are fully covered on the mesh. The final product is dried in vacuum drier at 60° C. for a night. FIG. 3 is cross sectional SEM diagram of the TSA membrane, indicating two distinct layers.

Implementation 5: The Wettability of TSA Membrane

Figure 4:
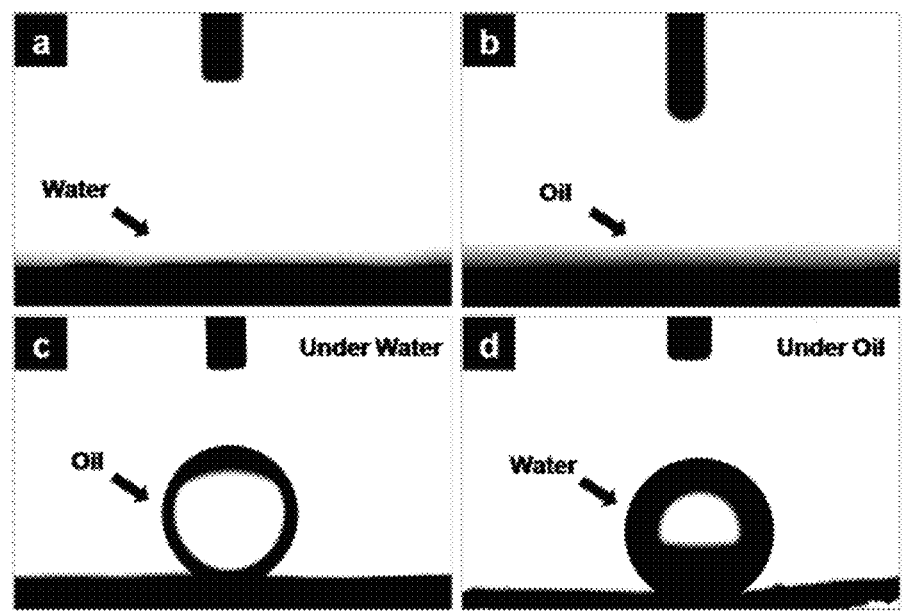
FIG. 4 shows the wettability of TSA membrane.

FIG. 4 is wettability of the TSA membrane, we can see that the TSA membrane is easily wetted by water and organic solvents in air (contact Angle is 0°), and when the TSA membrane is dipped in water, a drop of toluene (3 μL) is dropped on the film, a spherical droplet is presented on the membrane (contact Angle is 152° C.), indicating the superhydrophobic oil underwater. Likewise, when TSA membrane is put in the oil, the contact angle of the water droplet (3 μL) on the membrane is 150° C., indicating that superhydrophobic under oil. In conclusion, The TSA membrane has special wettability.

Figure 5:
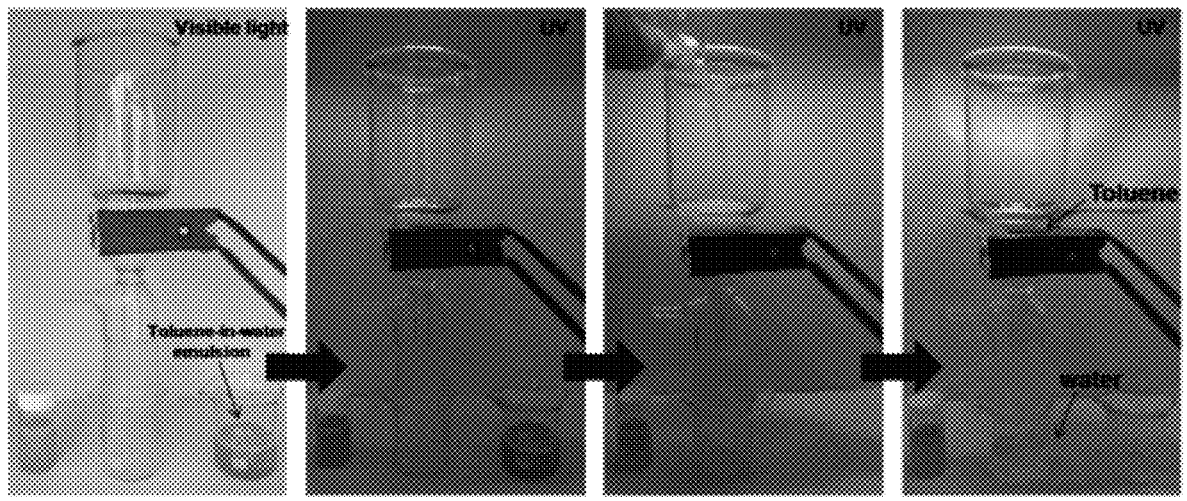
FIG. 5 shows the separation step of oil-water emulsion.

Implementation 6: The emulsion separation, specific steps are as follows:

5 mL (45 mL toluene) water and 45 mL (5 mL water) toluene are mixed, then 5 mg cetyl trimethyl ammonium bromide is added in the mixture under ultrasonic for six hours, then making the emulsion separation. The as-fabricated TSA membrane is fixed into a glass tube, then 30 mL oil-in-water emulsion is poured into the glass tube. FIG. 5 shows the steps of oil-water emulsion separation, indicating that the oil-water emulsion containing methylene blue became clear after pouring in the glass tube with modified double layer stainless mesh. The result illustrates the good emulsion separation effect.

Implementation 7: Separation efficiency and Flux, specific steps are as follows: Separation efficiency and permeate flux:

The separation efficiency of the oil-in-water emulsions is calculated using the following equation (1):

$$R(\%)=(1-C_p/C_o)\times 100\% \quad (1)$$

Where R (%) is a water rejection coefficient, and $C_p$ and $C_o$ are the oil (or water) concentrations in the collected water (or oil) and the original oil/water emulsion, respectively. Purified water is measured by UV-Vis spectrophotometry. Determine moisture content before and after filtration using Karl Fischer moisture titration.

The flux of the emulsion is determined by calculating the amount of permeation per unit time according to the following equation (2):

$$\text{Flux}=V/At \quad (2)$$

where A ($cm^2$) is the effective filtration surface of the membrane, V ($L/m^2h$) is the permeation volume, and t (h) is the separation time.

For each test, a certain amount of oil-in-water emulsion is poured into the filter, and the system is tested with 6 samples to obtain average results.

Figure 6:
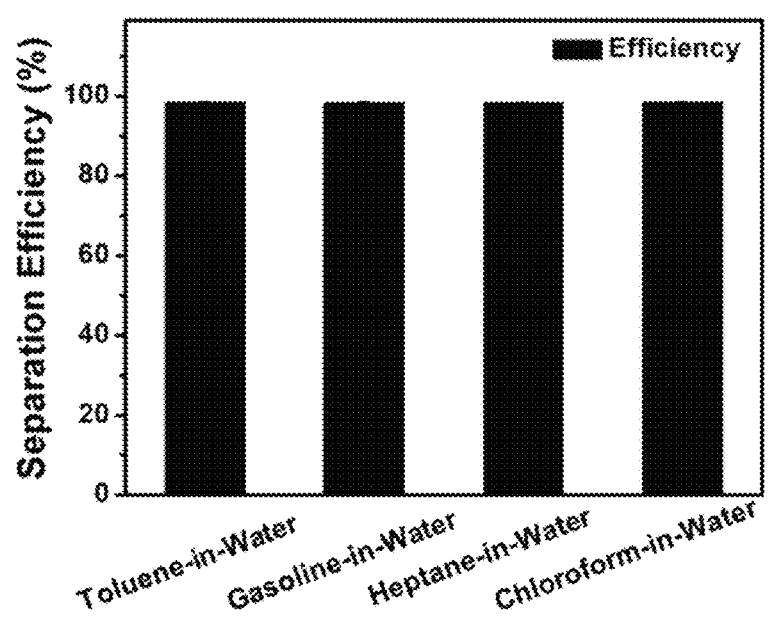
FIG. 6 shows the separation efficiency of TSA membrane.
Figure 7:
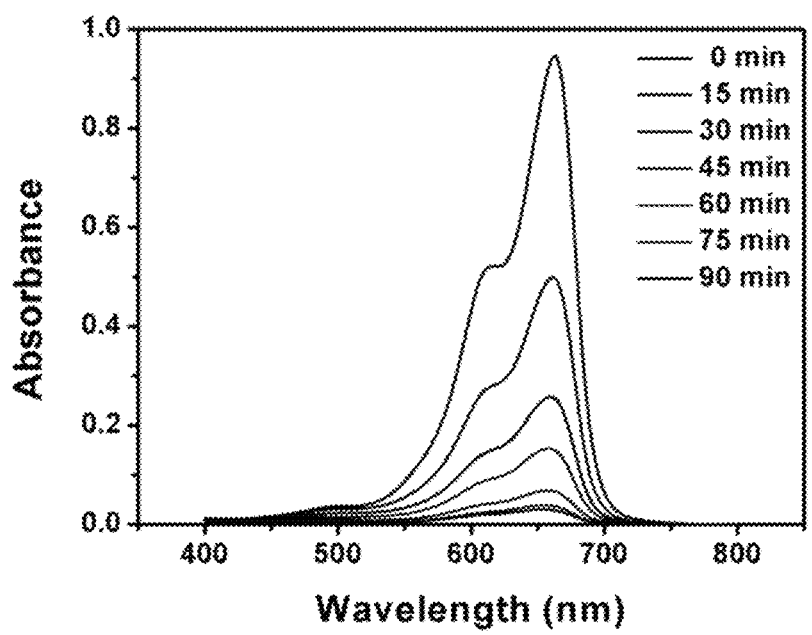
FIG. 7 shows the degradation of the TSA membrane.

FIG. 6, 7 is the separation efficiency of different oil/water emulsion and degradation effect of TSA membrane, the TSA membrane (4 cm in diameter) is fixed on the sand core filtration device, 100 mL oil-in-water emulsion containing MB is slowly poured into it under the 250 W UV lamp. The whole separation process is driven by gravity. The figures illustrate a high separation efficiency (over 99.6%) and good degradation effect.

Figure 8:
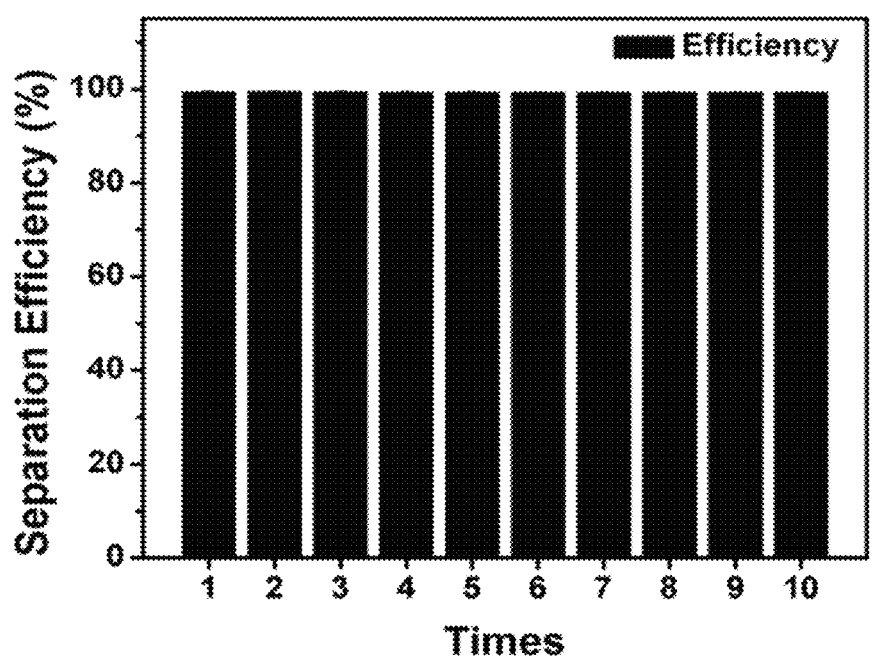
FIG. 8 shows the measurement of the separation efficiency of the same TSA film after 10 cycles of separation.

FIG. 8 is the separation efficiency of TSA membrane after 10 times separation, indicating a good recycle ability.

Throughout the above analysis, the TSA membrane fabricated by this invention via hydrothermal method and reduction method possessing the function of emulsion separation and dye degradation with one step. The membrane has advantages of high separation efficiency, good circulation, facile preparation methods and cheap raw materials. Therefore, the membrane has a good application prospect in the emulsion separation and sewage treatment.

What is claimed is:

1. A preparation method of titanium dioxide/sulfonated graphene oxide/silver nanoparticle composite membrane, comprising the following steps:
   (1) mixing graphene oxide, sodium chloroethanesulfonate, and sodium hydroxide uniformly in the water, and then adding concentrated nitric acid to obtain sulfonated graphene oxide;
   (2) mixing the aqueous solution of said sulfonated graphene oxide with the aqueous solution of silver nitrate, stirring in the dark, then adding ascorbic acid, and continuing to stir to obtain a silver nanoparticle/sulfonated graphene oxide composite material;
   (3) preparing titanium dioxide nanoclusters on a metal mesh by using tetra-n-butyl titanate, glycerol, and ethanol as raw materials to obtain a metal mesh with titanium dioxide nanoclusters; then the metal mesh with titanium dioxide nanoclusters is put in a mixed solution of titanium trichloride, saturated aqueous solution of sodium chloride and urea, said metal mesh is removed after the reaction to obtain titanium dioxide nanorod arrays;
   (4) dispersing said silver nanoparticle/sulfonated graphene oxide composite material in water, and then deposited on said titanium dioxide nanorods arrays by vacuum deposition, and vacuum dried to obtain titanium dioxide/sulfonated graphene oxide/silver nanoparticle composite membrane.

2. The preparation method of titanium dioxide/sulfonated graphene oxide/silver nanoparticle composite membrane according to claim 1, wherein in step (1), the mass ratio of graphene oxide, sodium chloroethanesulfonate, and sodium hydroxide is 0.2:3:1.6; after mixing said graphene oxide, sodium chloroethanesulfonate, and sodium hydroxide uniformly in water, ultrasonic stirring for 3 hours at room temperature, and then adding concentrated nitric acid; after the reaction is completed, the product is centrifuged, washed and dried to obtain sulfonated graphene oxide.

3. The preparation method of titanium dioxide/sulfonated graphene oxide/silver nanoparticle composite membrane according to claim 1, wherein in step (2), the mass ratio of sulfonated graphene oxide, silver nitrate and ascorbic acid is 1:6.8:8.8; said stirring is carried out in the dark for 3 hours at 25° C.; the time of continued stirring is 1 hour.

4. The preparation method of titanium dioxide/sulfonated graphene oxide/silver nanoparticle composite membrane according to claim 1, wherein in step (3), the volume ratio of tetra-n-butyl titanate, glycerin, and ethanol is 1:5:15; the temperature of the preparation of titanium dioxide nanoclusters on the metal mesh is 180° C., the time is 24 hours; the mass ratio of urea, titanium trichloride, sodium chloride is 1:2:36.6; the temperature of the reaction is 160° C., and the time is 2 hours.

\* \* \* \* \*